United States Patent [19]
Jansson

[11] Patent Number: 5,816,635
[45] Date of Patent: Oct. 6, 1998

[54] CHOCK VALVE FOR A VACUUM LIFTING DEVICE

[75] Inventor: Ronny Jansson, Billdal, Sweden

[73] Assignee: Ljungblad-Petre Maskin AB, Molndal, Sweden

[21] Appl. No.: 776,637

[22] PCT Filed: Mar. 29, 1995

[86] PCT No.: PCT/SE95/00332

§ 371 Date: Jan. 24, 1997

§ 102(e) Date: Jan. 24, 1997

[87] PCT Pub. No.: WO96/03602

PCT Pub. Date: Feb. 8, 1996

[30] Foreign Application Priority Data

Jul. 26, 1994 [SE] Sweden .................................. 9402570
Nov. 22, 1994 [SE] Sweden .................................. 9404029

[51] Int. Cl.⁶ ................................................... B66C 1/02
[52] U.S. Cl. ................................................ 294/64.1; 414/627
[58] Field of Search ........................ 294/64.1–65; 901/40; 414/627, 737, 752; 271/94, 96, 103

[56] References Cited

U.S. PATENT DOCUMENTS

| | | | |
|---|---|---|---|
| 3,322,454 | 5/1967 | Mindrum ................................ | 414/627 |
| 4,561,687 | 12/1985 | Bostrom ................................ | 294/64.1 |
| 5,035,456 | 7/1991 | Messinger ............................. | 294/64.1 |
| 5,330,314 | 7/1994 | Bennison .............................. | 294/64.1 |

*Primary Examiner*—Dean Kramer
*Attorney, Agent, or Firm*—Merchant, Gould, Smith, Edell, Welter & Schmidt

[57] ABSTRACT

A shock valve for vacuum lifting devices of the type incorporating a suspended flexible hose with suction head and connected to a vacuum source, wherein the lifting motion is effected in that a negative pressure in the hose causes the suction head to retain a load and to raise this due to the contraction of the hose caused by the internal negative pressure, and where the shock valve (6) is intended to prevent uncontrolled throwing movements when a load is dropped during prevailing negative pressure, whereby the shock valve (6) is connected to the interior of the hose adjacent the lower end thereof, and is provided with a body of inertia (16), which forms part of the shock valve, which body of inertia is connected to or constitutes members adapted for exposing large valve openings (11, 12), at momentary immobile condition of the body of inertia caused by the relative motion of the body of inertia in relation to the other parts of the shock valve, which occurs initially at a rapid acceleration of the hose, whereby the vacuum in the hose will cease very rapidly.

10 Claims, 6 Drawing Sheets

CHOCK VALVE FOR A VACUUM LIFTING DEVICE

The present invention refers to a shock or speed variation valve for vacuum lifting devices.

For moving and transporting different types of objects short distances in modern goods handling it is frequently used vacuum lifting devices, of the type equipped with a flexible vacuum hose, which at one of its ends is connected to a vacuum source, preferably in the form of a pump, and which at the opposite end is provided with one or more suction nozzles, or alternatively some other type of coupling member, e.g. a hook. When the suction nozzle is placed against a surface of an object which shall be raised, and the vacuum pump is started, the suction nozzle due to the vacuum generated in the hose and in the nozzle will attach sealingly to the object. When thereupon the operation of the pump causes an increase of the sub-pressure the flexible hose will be "sucked in" thereby being shortened, whereby the load is raised. A lifting hose equipped with another type of coupling means e.g. a hook, will be shortened in a corresponding manner and thereby raise the load suspended from the other type of coupling means. In the vicinity of the suction nozzle or the alternative coupling means there is provided a vacuum valve, by means of which it is possible, in dependency of the degree to which it is opened, to alter the pressure ratio in the conduit, from a maximum negative pressure when the valve is closed, to a pressure substantially corresponding to the pressure of the surrounding atmosphere, when the valve is completely open. In this manner it is possible to set the desired lifting speed, to balance the sub-pressure thus that the load is maintained in an arbitrarily raised position and by further opening eventually to achieve that the vacuum becomes insufficient for lifting the weight of the load, whereby the load is lowered again. When the valve is completely opened and/or when the vacuum pump is turned off, the suction nozzle will come loose from the load, or the hose will be so mobile, that other types of coupling means easily may be unhooked. Lifting devices of this type are often used frequently in different material handling connections, whereby much heavy lifting work can be eliminated.

However, due to the big dynamical forces to which the hose and suction head are subjected during lift, there is a risk, which has not been sufficiently observed earlier, for damages to equipment and particularly injuries to personnel, attending to the lifting device, if the load for any reason should come loose in an uncontrolled manner during a lift or during balanced retention of the load in raised position, e.g. in that the load during the lift should hit some fixed object at the place of the lift, e.g. a railing, a wall or the like. Hereby the hose, due to the fact, that the load suddenly ceases to act in a direction opposed to that of the vacuum force, will be thrown upwards at a very high velocity and due to the flexibility of the hose it will be flinged about in an uncontrolled manner, whereby there is a risk that the comparatively heavy suction head/coupling means and the operating valve may hit other objects and cause damage to those or to itself and/or hit personnel dwelling thereabout, meaning an apparent risk for personnel injuries. Also in the case with suction heads, which are exposed at a possible coming loose of the load, a very rapid speed increase will arise as the openings of the suction head have an insufficient area for momentarily compensating the intense negative pressure in the hose.

The purpose of the present invention is to provide a shock or speed variation valve for a vacuum lifting device of the type described in the introduction, which in a simple and efficient manner and at rather low manufacturing costs, to a very high extent eliminates the problem described, and in order to achieve this the shock valve is designed in accordance with the characterizing part of claim 1.

Hereinafter the invention will be further described with reference to embodiments illustrated in the accompanying drawings.

Figure 1:
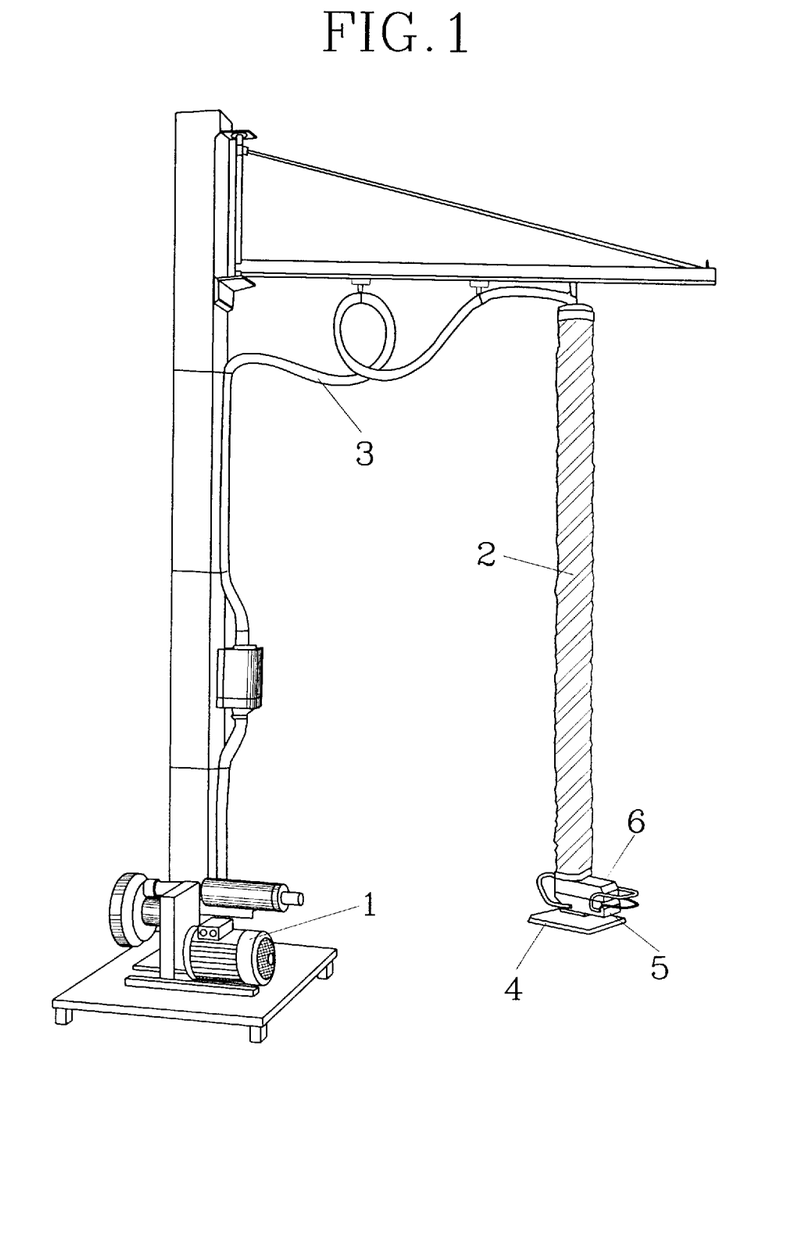
FIG. 1 shows diagrammatically a vacuum lifting device of a type known per se, which is equipped with a shock valve according to the invention.

In FIG. 1 is shown in perspective an embodiment of a vacuum lifting device, which incorporates a bass with a vacuum pump 1 provided thereupon, and a boom stand, which supports a flexible vacuum hose 2 suspended therefrom, one end of which via a conduit 3 is connected to the vacuum pump. At its end opposed to the suspended end, the flexible vacuum hose 2 is provided with a suction head 4 and an operating valve 5 provided in the proximity thereof. Adjacent the free end of the hose 2, i.e. near the suction head there is also connected a shock valve 6 in accordance with the invention.

As mentioned above a vacuum applied to the suction head 4 when the valve in the valve housing 5 is completely closed, will result in that an object (having a maximum weight in dependency of the capacity of the vacuum pump) is sucked to the suction head, whereupon the flexible vacuum hose due to the increased vacuum is sucked together, thus that the hose is shortened and the object is raised. By opening the valve a little it is possible to retard the lifting speed, and at increased opening an equilibrium condition is first reached, where the lifting motion has stopped completely. At increased further opening the load thereupon will again be lowered, and when the valve is completely open the suction head has lost its ability to retain the object. If an object in lifting position should come loose during the time the vacuum source is still in operation, and where the lifting device has no shock valve, the flexibility of the hose 2 in combination with the instantaneously expiring weight, which at least partly compensates the sub-pressure, will result in that the hose 2 with the heavy and hard components applied to the lower end thereof would be thrown upwards towards the suspension point for the hose, for thereupon falling downwards quite uncontrollable.

Figure 2:
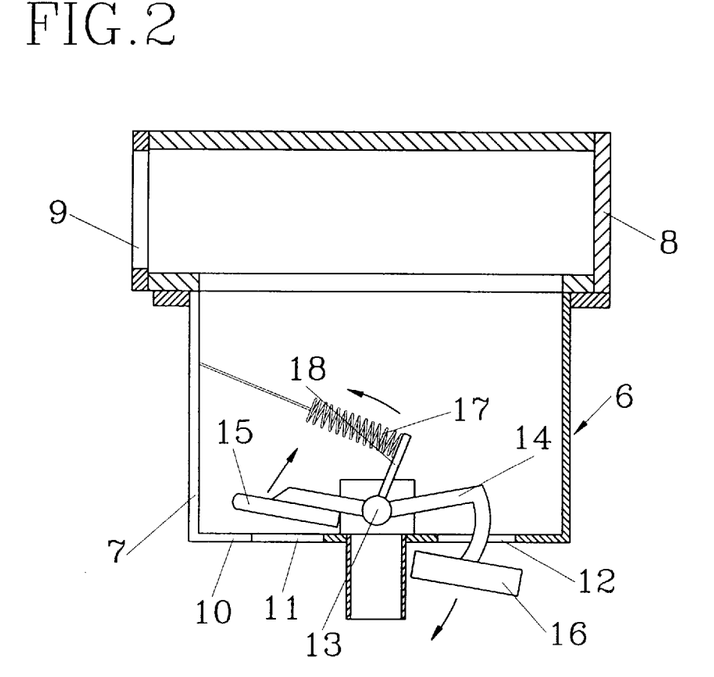
FIG. 2 shows in cross section a first embodiment of a shock valve according to the invention, in active position.
Figure 3:
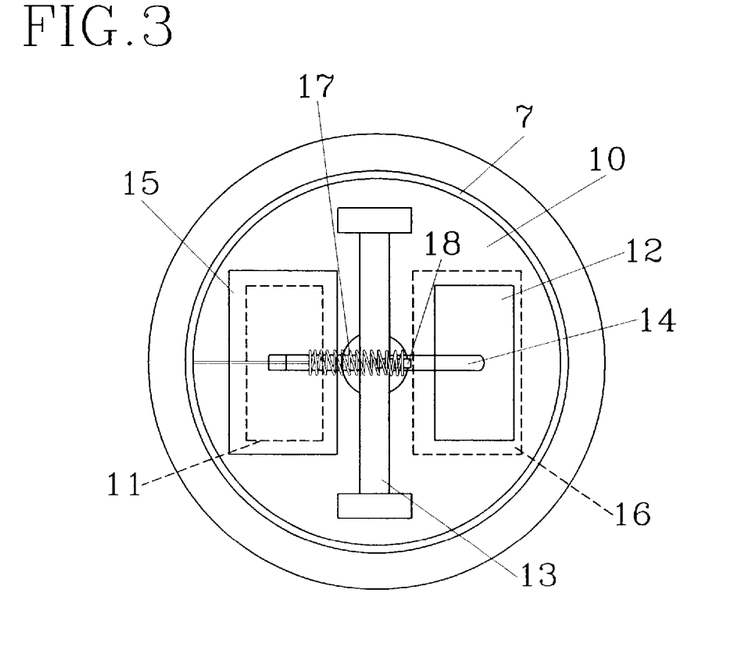
FIG. 3 is a diagrammatic view from above of the valve according to FIG. 2.

In FIG. 2 is shown in side view and in cross section and in FIG. 3 from above, a first embodiment of a shock or speed variation valve 6, according to the invention. The valve 6 in the embodiment shown is constituted by a substantially cylindrical housing 7, which via an open upper end communicates with a connection part 8, which in turn via an opening 9 communicates with the interior of the flexible vacuum hose 2, which is not shown in FIGS. 2 and 3.

At the lower end of the cylindrical housing 7 this is provided with an end wall or a bottom 10, in which is provided two openings 11 and 12, respectively. In the housing 7 there is also provided a pivot axis 13, which via a couple of arms 14 support a first and a second valve body 15 and 16, respectively, dimensioned and adapted simultaneously to be pivotable about the pivot axis 13, between a normal position closing the two openings 11, 12 and positions in which those openings are exposed more or less.

The arrangement is such that the first valve body 15 is situated inside the valve housing 7 and is adapted in sealing position to seal off one of the openings 11 by contacting the inner side of the valve housing bottom 10, whereas the other valve body 16 is situated outside the valve housing 7 and is adapted in sealing position to seal off the other opening 12 by contacting the outer side of the valve housing bottom 10.

The second valve body 16, which is situated at the lower side of valve housing 7, and thus is movable between an upper, normal position closing the valve and lower positions opening the valve, has a bigger mass than the first valve body 15, and which via the arm couple 14 therefore are moveable simultaneously, between a lower position closing the valve and an upper position opening the valve. In FIGS. 2 and 3 this has been illustrated in that the valve body 16 has been given a bigger size than the first valve body 15, but the difference in mass between the two valve bodies can of course be achieved also in other manners. For out-balancing the heavier, second valve body 16, thus that the two valve bodies 15, 16 are in balance and in normal position close the two valve openings 11, 12 of the valve housing, there is in the embodiment illustrated, provided a tension spring 17, which is fixed between a portion of the valve housing and a momentum lever 18 fixedly connected to the pivot axis 13. The spring 17 is adapted to provide a force, which together with the weight of the first valve body corresponds to the weight of the second valve body, whereby, in normal position, i.e. where the shock valve 6 is uninfluenced by external forces, the valve bodies close both valve openings 11, 12.

The function of the shock valve according to the invention, shown in FIGS. 2 and 3 is the following:

When a vacuum source, e.g. the vacuum pump 1 establishes a negative pressure in the flexible hose 2, and the suction head 4 is placed against an object to be lifted, the negative pressure generated by the vacuum source tends to suck in the hose 2, and thereby to lift the suction head 4 and its load. The interior of the hose is connected to the operating valve 5, by means of which the extent of the vacuum can be controlled, thus that the direction and speed of the lift can be adjusted in that the operating valve is brought to open more or less, a communication to the surrounding atmosphere. If the load suddenly should come loose from the suction head during the time a sub-pressure is present in the hose, the lower part of the hose 2, and mechanisms attached thereto, i.e. also the shock valve 6 according to the invention, will obtain a momentary upwardly directed acceleration. At this rapid acceleration the equilibrium condition in the shock valve 6 however will be disturbed, due to the inertia in the second, lower positioned valve body 16, with its bigger mass. Hereby the valve body will open, after a short upward movement of the lower part of the hose and particularly of the shock valve, such as illustrated in FIG. 2, depending on that the two valve bodies 15, 16 will get a dynamic additional force. As the spring 17 will have no such dynamic additional force the second valve body 16 having a bigger mass hereby will pivot the arm couple 14 in clockwise direction and the two valve bodies 15 and 16 open rapidly, and the atmospheric pressure will swiftly be taken up in the hose, whereby the upward acceleration of the hose is interrupted. Tests made show that it in this manner has been possible to limit the rapid movement of the hose at a drop of load from the entire length of the hose to some decimeter only.

Figure 4:
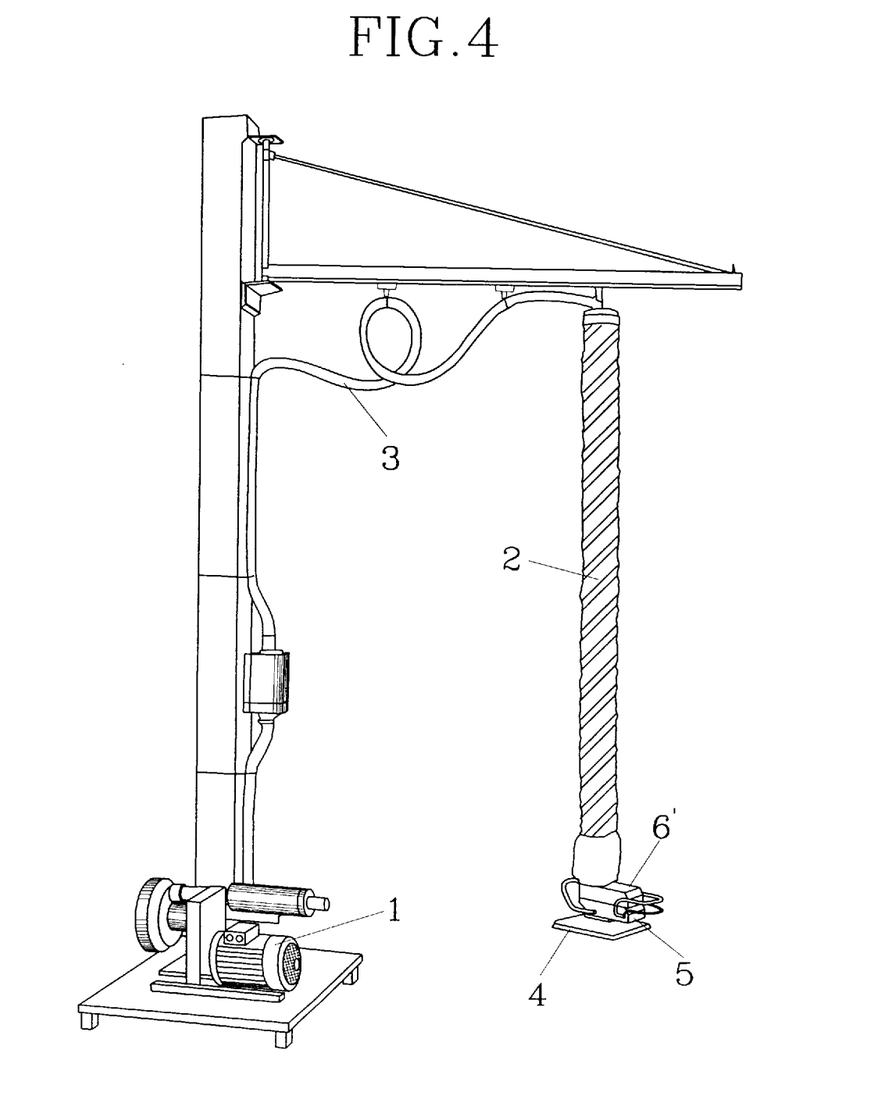
FIG. 4 is a view corresponding to FIG. 1, with a second embodiment of a shock valve according to the invention.

In FIG. 4 is shown in a view corresponding to FIG. 1 an identic vacuum lifting device with a vacuum pump 1 connected to a vacuum hose 2 via a conduit 3, a suction head 4 and an operating valve 5. The only thing distinguishing this device from that of FIG. 1 is the design of the vacuum valve 6', which in this case is construed as a cylinder connected to the vacuum hose 2 and being concentric with this.

Figure 5:
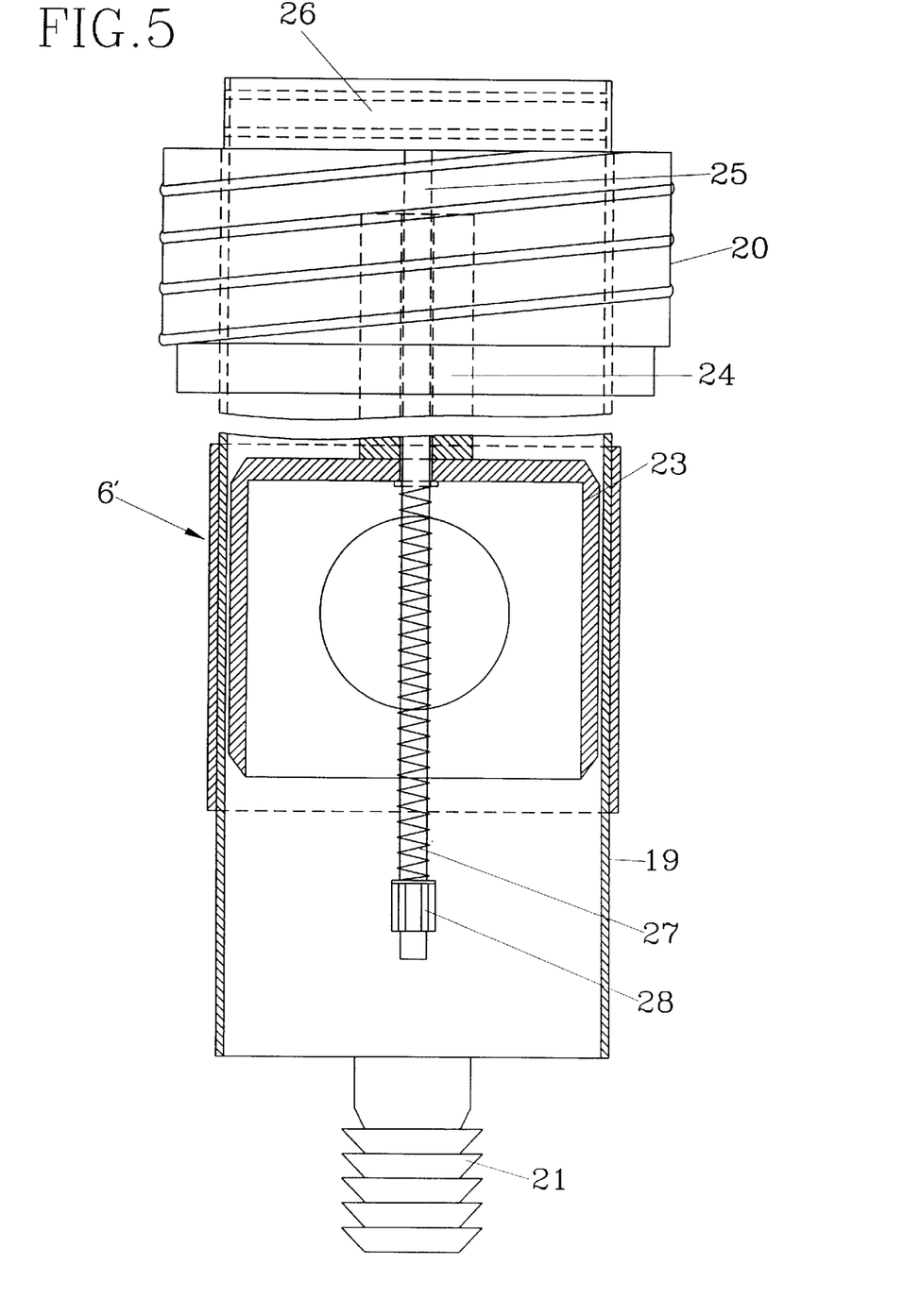
FIG. 5 shows partially in cross section a shock valve according to FIG. 4 in inactive position.

In FIG. 5 is shown in side view and in partial cross section an embodiment of the shock or speed variation valve 6' according to the invention. The valve 6' in the embodiment shown is constituted by a substantially cylindrical housing 19, which at an open upper end is provided with a connection part 20 for connection to the vacuum hose 2 (see FIG. 4).

At the lower end of the cylindrical housing 19 this is provided with a nipple 21 for connection to the operating valve 5 (see FIG. 4).

In the envelope surface of the cylindrical housing 19 is provided a number of large through openings 22 distributed about the circumference of the cylindrical housing 19. In the view according to FIG. 5 there is shown only one opening, but there are preferably at least three openings 22 arranged essentially along a common circumferential line and arranged at equal mutual spaces.

Inside the cylindrical housing 19 there is arranged a tubular valve body 23, which is slidably arranged in axial direction in the housing 19. To this purpose the body 23 is provided with a tubular guidance 24, which is moveable axially along a shaft 25 arranged axially in the housing 19, which shaft in the embodiment shown is suspended from a transverse arm 26, extending diametrically through the housing 19.

The tubular guidance 24 in this embodiment is made with a rather big mass, and thereby the axially movably mounted body 23 with its tubular guide 24 operates as a body of inertia.

In the inactive position of the shock valve, i.e. when the system is completely immobile or is subjected only to normal handling motions with displacements in vertical and/or horizontal direction, the valve body 23 in the embodiment shown is maintained in a position where its wall under substantial sealing-off covers the openings 22 in the valve housing, whereby the vacuum is maintained in the hose except for neglectable leakage losses. The valve body 23 is kept in this position by means of a spring 27 arranged around the shaft 25, which spring with one of its ends engages a stop 28 on the shaft 25 and with its other end acts against the valve body 23. In these positions the shock valve thus is inactive end the internal sub-pressure in hose 2 and any suction heads attached to the device is controlled by adjustment via a vacuum source and via operating valve 5.

Figure 6:
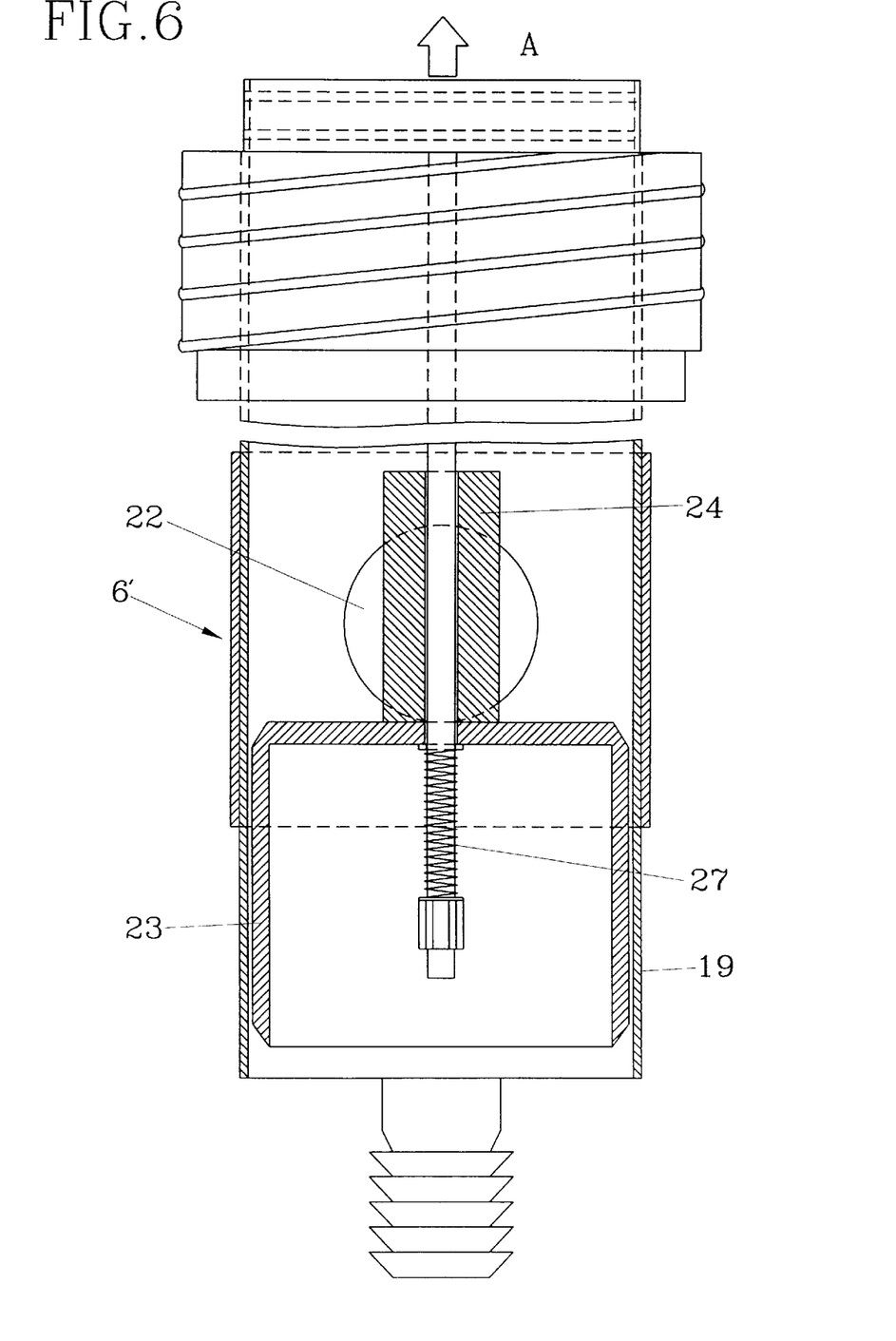
FIG. 6 is a corresponding view of the valve in FIG. 4 in active position.

In FIG. 6 is shown in a view corresponding to FIG. 5 a position where the entire vacuum lifting device and the shock valve forming part thereof have been subjected to a very rapid speed increase, which is illustrated by the arrow A, e.g. caused by a supported load, which has dropped momentarily.

At the rapid acceleration, the valve housing 6' will move rapidly in the direction opposite to that in which the earlier supported load earlier strived. Due to the inertia of the valve body 24 which is designed as a body of inertia and with the tubular guidance 24 attached thereto, the valve body 23 initially will not accompany the valve housing and the other equipment at their rapid motion, but it will during the initial moment be substantially immobile, whereby it during compression of the spring overcomes the spring force thereof and obtains an axial relative displacement relative to the valve housing 19 and its through openings 22. When these openings 22 are exposed there occurs an immediate inflow of surrounding air through the exposed big inflow areas, and this means that the interior of the valve, and thereby the hose, immediately will obtain a substantially reduced vacuum, whereby the acceleration of hose and valve arrangement ceases immediately.

After this retardation of the acceleration of the valve housing the valve body 23 is returned to the position shown in FIG. 5 by the force of the spring 27, thereby covering and sealing off the openings 22.

Figure 7A:
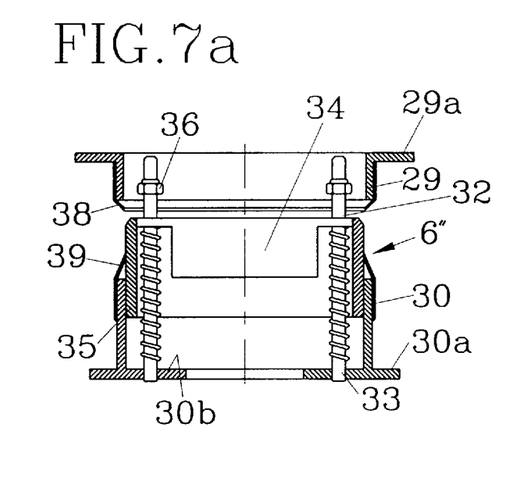
FIGS. 7a and 7b show a third embodiment of a shock valve according to the invention in active and inactive positions, respectively, and in cross section.
Figure 8A:
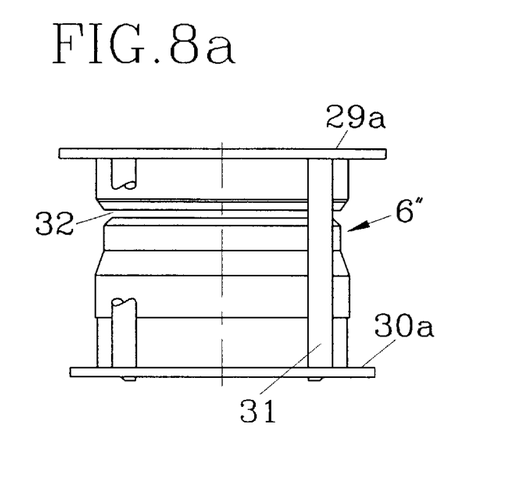
FIGS. 8a and 8b are side views of the shock valve according to FIGS. 7a and 7b in corresponding positions.

In FIG. 7a is shown in cross section and from the side a further embodiment of a shock valve 6" according to the invention, which incorporates a cylindrical housing divided into two separate cylindrical, tubular parts 29, 30, each of which at one side is provided with a circumferential external flange 29a and 30a, respectively. Such as shown in FIG. 8a the two housing parts 29, 30 are held together by bolts 31, which extend through the flanges 29a, 30a in such manner that the housing parts 29, 30 are situated with an axial mutual space, leaving an annular slot 32 between them.

Figure 7B:
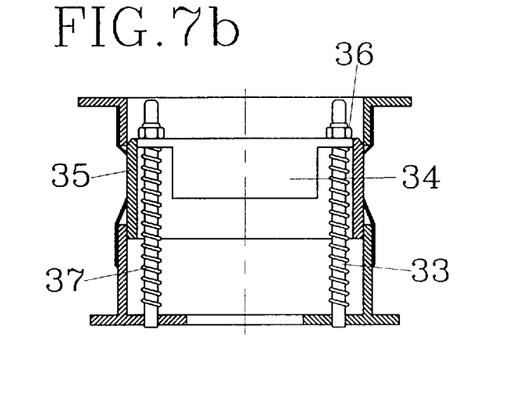
Figure 8B:
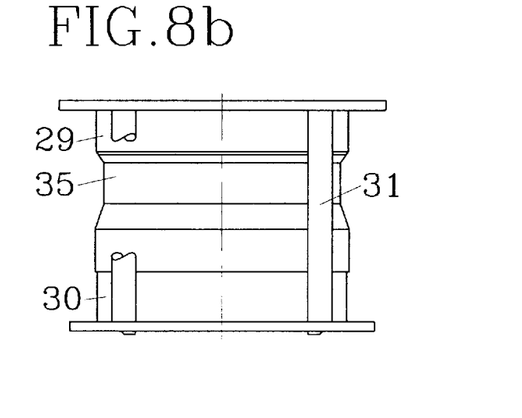
Figure 9:
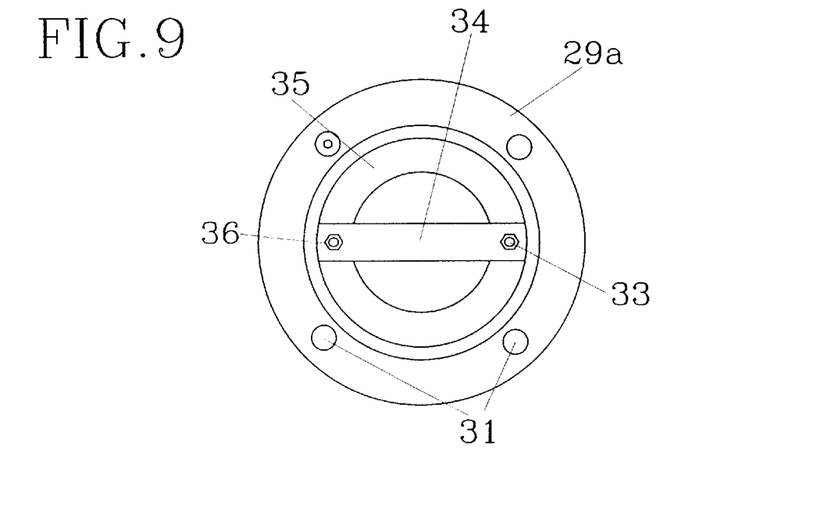
FIG. 9 shows the shock valve according to FIGS. 8a and 8b in a view from above.

In a part 30b of the flange 30a of one of the housing parts there is affixed guiding dowels 33 extending axially through the housing, in the embodiment shown two diametrically opposed guiding dowels 33, which act as axial guides for a yoke 34 extending diametrically through the housing 6", which is provided with through bores, through which the guiding dowels 33 extend, and which yoke supports a cylindrical, preferably tubular valve body 35, which is axially movable within the housing 29, 30 and the motion of which in one direction is limited by said inwardly directed flange portion 30b of one of the housing parts 30 and in opposite direction by stops, fitted to the guiding dowels 33, e.g. in the form of nuts 36. A pre-tensioning is exerted on the yoke 34 by springs 37, arranged about the guiding dowels, and which press the yoke against a position, which is shown in FIGS. 7b and 8b, where the valve body 35 is closing the slot 32 between the two housing pus 29, 30 completely.

At a rapid acceleration of the vacuum hose 2 in the lifting direction, i.e. in a direction upwards as shown in the figures, caused e.g. by the load being dropped, the mass of the yoke 34 and the valve body 35 rigidly connected thereto will act as a body of inertia, which is momentarily immobile during the initial phase of the rapid acceleration, and therefore has an ability of compressing the springs 37 provided in connection to the guiding dowels 33, whereby there occurs an mutual axial relative movement between the valve body 35 and the housing 6" thus that the slot 32 is opened momentarily and due to the large area of the opening, the vacuum will rapidly be equalized to just about atmospheric pressure, whereby the rapid uncontrolled movement of the hose end and members affixed thereto ceases immediately.

In order to increase the sealing effect between valve body 35 and the housing parts 29, 30 there is at the ends of the housing parts facing each other preferably provided flexible seals 38, 39 in the form of rubber sleeves or the like.

The invention is not limited to the embodiments illustrated in the drawings and described in connection thereto but variations and modifications are possible within the scope of the following claims. Although the shock valve according to the invention thus has been shown as a separate valve provided above suction head and operating valve, it might e.g. be positioned in another place and it might even be formed integral with the operating valve or inside the very suction head.

I claim:

1. A shock valve for vacuum lifting devices of the type incorporating a suspended flexible hose (2) with a auction head (4) and connected to a vacuum source, wherein the lifting motion is effected in that a negative pressure in the hose causes the suction head to retain a load and to raise this due to the contraction of the hose caused by the internal negative pressure, and where the shock valve (6, 6', 6") is intended to prevent uncontrolled throwing movements if a load is dropped during prevailing negative pressure, characterized therein, that the shock valve (6, 6', 6") is connected to the interior of the hose (2) adjacent the lower end thereof, and is provided with a body of inertia (16; 24; 34), which forms part of the shock valve, which body of inertia is connected to or constitutes means adapted for exposing large valve openings (11, 12; 22; 32), at momentarily immobile condition of the body of inertia, caused by the relative motion of the body of inertia in relation to the other parts of the shock valve, which occurs initially at a rapid acceleration of the hose, whereby the vacuum in the hose will cease very rapidly.

2. A shock valve as claimed in claim 1, characterized therein, that the shock valve (6) is connected to the interior of the hose (2) in the vicinity of the lower end of the hose, and is equipped with a couple of valve bodies (15, 16) pivotably suspended in bridge form and adapted to sealingly engage one of two valve openings (11, 12) each in the valve, that one of the valve bodies (15, 16) has bigger mass than the other, and that means (17) are provided for outbalancing the two valve bodies (15, 16) and thereby pre-tensioning the bridge-formed couple of valve bodies (15, 16) towards closing position.

3. A shock valve as claimed in claim 2, characterized therein, that the valve (6) incorporates a valve housing (7), which is connectable to the interior of the hose (2) and in its lower part provided with the two valve openings (11, 12), whereby the bridge formed pivotably arranged couple of valve bodies (15, 16) are positioned with the first valve body (15) situated inside the valve housing (7) and being adapted in sealing position to seal off against the inner side of the lower part (10) of the valve housing, and with the second valve body (16) outside the valve housing (7) and adapted in sealing position to seal off against the outer side of the lower part (10) of the valve housing.

4. A shock valve as claimed in claim 3, characterized therein, that the valve body (16) situated outside the valve housing (7) is the valve body having bigger mass than the valve body situated inside the valve housing.

5. A shock valve as claimed in claim 1, characterized therein, that the shock valve incorporates a substantially tubular housing (19; 29, 30) connected to the interior of the hose and being substantially concentric with the hose, and having provided in its envelope surface at least one through-opening (22; 32), and that in the housing is provided an axially movable valve body (23; 35) provided with a body of inertia (24; 34), and pre-tensioned against a position sealing off said at least one opening in the envelope surface of the housing, but being adapted during a rapid acceleration of the hose, due to its inertia and against the action of the pre-tensioning to expose said at least one opening in the housing envelope surface.

6. A shock valve as claimed in claim 5, characterized therein, that in the housing is provided at least one axial guidance (25; 33) adapted to guide and limit the movement of the valve body (23; 35) relative to the housing.

7. A shock valve as claimed in claim 6, characterized therein that the said guidance is constituted by an axial, elongated member (25; 33) provided with springs (27; 37) acting against stops (28; 36) and pre-tensioning the valve body (23; 35) towards positions closing the openings (22; 32).

8. A Shock valve as claimed in claim 5, characterized therein, that the valve housing (19) is provided with at least one opening (22) arranged through its envelope surface.

9. A shock valve as claimed in claim 5, characterized therein, that the valve housing consists of two concentric sleeve-shaped halves (29, 30), which are kept together thus that between the ends thereof facing each other is formed a slot (32), which forms said opening.

10. A shock valve as claimed in claim 9, characterized therein, that the concentric halves (29, 30) are kept together by means of bolts (33), which also form said guidance for the valve body (35).

* * * * *

UNITED STATES PATENT AND TRADEMARK OFFICE
CERTIFICATE OF CORRECTION

PATENT NO. : 5,816,635

DATED : OCTOBER 6, 1998

INVENTOR(S) : JANSSON

It is certified that error appears in the above-identified patent and that said Letters Patent is hereby corrected as shown below:

Col. 2, line 32: "bass" should read --base--

Col. 5, line 47: "pus" should read --parts--

Col. 6, line 10: "auction" should read --suction--

Signed and Sealed this

Fourteenth Day of March, 2000

Attest:

Attesting Officer

Q. TODD DICKINSON

Commissioner of Patents and Trademarks